United States Patent Office 3,594,152
Patented July 20, 1971

3,594,152
METHOD OF PRODUCING CYTOPLASMIC MALE STERILITY IN MAIZE
Dmitry Fedorovich Petrov, Sovetskaya, ulitsa 7, kv. 39; Ekaterina Sergeevna Fokina, Tsvetnoi proezd 17, kv. 49; and Natalia Borisovna Zheleznova, Morskoi prospekt 13, kv. 18, all of Novosibirsk, U.S.S.R.
No Drawing. Filed Sept. 21, 1967, Ser. No. 669,407
Int. Cl. A01n 9/00
U.S. Cl. 71—88                           3 Claims

ABSTRACT OF THE DISCLOSURE

A method of producing cytoplasmic male sterility in maize by using the antibiotic streptomycine to cause a mutation of extrachromosomal genes which is known for the monocellule alga Chlamydomonas.

---

The present invention relates to methods of producing cytoplasmic male sterility in plants. More particularly, the invention has to do with methods applicable in agriculture predominantly for producing male sterility in analogs of inbred lines of maize.

A method of producing cytoplasmic sterility in plants is, which is based on the property of the antibiotic streptomycine to cause extranuclear mutation is known. (R. Sager. Genes outside the chromosomes. Sci. Amer. No. 1, 71–79 (1965)). This property of streptomycine in certain concentrations was made use of for the purpose of sharply increasing the frequency of mutation of genes in the chromosomes of the green alga Chamydomonas.

However, this property of the antibiotic streptomycine was not known to extend to higher plants, e.g. maize.

Other known methods of producing cytoplasmic male sterility in plants, in particular maize, are very laborious and time-consuming. Thus, for example, for commercial seed production, on a sterile basis, of line hybrids whose parents include inbred lines it is first necessary to produce sterile sublines (analogs).

The production of said analogs is achieved by repeated enhancing crossings with lines carrying cytoplasmic male sterility. For the production of sterile analogs the enhancing crossings must be carried out for 6 generations which hinders commercial seed production of new line hybrids of plants, e.g. maize, on a sterile basis, and holds up their introduction.

It is an object of the present invention to provide a method of producing cytoplasmic male sterility in plants based on the property of the antibiotic streptomycine to cause extra-nuclear mutation.

It is another object of the invention to shorten the time required for producing cytoplasmic male sterility in plants, for instance, for the commercial production of line hybrids of maize.

It is still another object of the invention to reduce labor consumption and capital investments involved in the production of cytoplasmic male sterility in plants.

The foregoing and additional objects have been accomplished by the provision of a method of producing cytoplasmic male sterility in plants wherein to produce sterile analogs of inbred lines of plants the seeds of said plants are treated with a solution of streptomycine in a concentration of $0.0001\gamma/\text{ml}$. to $10\gamma/\text{ml}$.

A preferred form of the invention contemplates treating maize seeds in the sprouts state with a solution of streptomycine for a period of 24 hours. Other objects and advantages of the invention will be disclosed in the following description and in the exemplary embodiment of the invention.

When describing said embodiment concrete terminology is employed for the sake of clearity, but the narrow terminology is not to be interpreted as limiting the invention. Therefore it must be borne in mind that each of said terms embraces all equivalent elements operating in a similar manner and used for solving the same problems.

According to the invention a method of producing cytoplasmic male sterility in plants comprises the following.

For producing sterile analogs of inbred lines of maize, the seeds are treated with a solution of streptomycine for a certain period of time, the concentration of said solution of streptomycine ranging from $0.0001\gamma/\text{ml}$. to $10\gamma/\text{ml}$.

Better results are obtained when sprouted maize seeds are treated with streptomycine solution and when treatment is continued for 24 hours. In this case the concentration of the streptomycine solution is also from $0.001$ $\gamma/\text{ml}$. to $10\ \gamma/\text{ml}$.

An example of the application of the method of producing male sterility in plants is the production of male sterility in the inbred $I_5$ line of the local Spasovshaya variety of maize.

Sprouted seeds of the inbred $I_5$ line of the local Spasovskaya variety of maize were treated for 24 hours with solutions of streptomycine ranging in concentration from $0.0005\gamma/\text{ml}$. to $10\gamma/\text{ml}$.

Plants were grown from the streptomycine-treated maize seeds. The number of male-sterile plants obtained is given in the table.

TABLE

| Streptomycine dose, $\gamma/\text{ml}$. | Number of plants grown from treated seeds | Number of male-sterile plants | Percent |
|---|---|---|---|
| 0.0005 | 32 | 5 | 15.6 |
| 0.001 | 36 | 12 | 33.3 |
| 0.01 | 32 | 16 | 50.0 |
| 0.1 | 50 | 7 | 14.0 |
| 1 | 44 | 5 | 11.3 |
| 10 | 46 | 9 | 19 |
| 100 | 44 | 0 | 0 |
| Control | 47 | 0 | 0 |

Investigation of the plants grown from the streptomycin treated seeds showed that in from 11.3 to 50% of said plants there was complete male sterility, whereas in the controls (untreated seeds of the same inbred line) male sterility was completely absent. The highest percentage of plants with male sterility (33.3% and 50%) was found when seeds were treated with solutions containing $0.001\gamma$ and $0.01\gamma$ of streptomycine per milliliter.

From this it follows that relatively weak concentrations of the antibiotic streptomycine cause sharp increases in cytoplasmic mutations in maize, resulting in male sterility.

When male-sterile plants obtained in this way were pollinated with pollen from sister plants not treated with streptomycine (controls), normal, full-grained ears were formed. In the populations obtained by planting the grain from said ears, about 50% of the plants in a number of cases were male-sterile, which demonstrates the heriditary character of male sterility caused by treatment with streptomycine.

Male sterility under the action of streptomycine appears only in inbred lines and varieties which are enhancers of the corresponding form of cytoplasmic male sterility, since in fertility restorer lines even the presence of extranuclear mutations which cause sterile cytoplasm do not produce phenotypic male sterility because of the presence of nuclear genes which restore male fertility.

Thus, by treating seeds with appropriate concentrations of streptomycin it is possible to obtain sterile analogs of inbred lines of high combinational value which are enhancers of the cytoplasmic form of male sterility by selecting plants with male sterility amount the generation from male-sterile plants from streptomycine-treated seeds.

The advantages of the present method of producing cytoplasmic male sterility in plants consist in the following:

Application of the present method makes it possible to obtain sterile analogs in valuable inbred lines involved in the production of commercial line hybrids considerably faster than by means of enhancing crossings, since in this case the difficult and complicated operation of eliminating the undesirable genotype of the female parent carrying cytoplasmic male sterility becomes unnecessary. Consequently commercial seed production of such line hybrids on a sterile basis can be accomplished much quicker, which is of considerable economic importance.

Through the present invention has been described in accordance with a preferred embodiment, various changes and modifications may be made in carrying out the present invention without departing from the spirit and scope thereof as will be understood by those skilled in the art.

These changes and modifications are to be considered as falling within the spirit and scope of the invention as defined in the appended claims.

We claim:
1. A method of producing cytoplasmic male sterility in maize, for developing sterile analogs of inbred lines of maize, said method comprising treating homozygote maize seeds with a solution of streptomycine in a concentration from $0.0001\gamma$ per milliliter to $10\gamma$ per milliliter.
2. A method as claimed in claim 1, wherein sprouted maize seeds are treated with said streptomycine solution for a period of 24 hours.
3. A method as claimed in claim 2 wherein the concentration is $0.001$–$0.01\gamma/\text{ml}$.

References Cited

UNITED STATES PATENTS 2,994,599   8/1961   McRae _____ 71—115

OTHER REFERENCES

Chemical Abstracts, vol. 48, col. 6513 (i), 1954.
Chemical Abstracts, vol. 55, col. 11743 (h), 1961.
Chemical Abstracts, vol. 55, col. 14797 (a), 1961.
Sager, Sci. Amer. No. 1 71–79 (1965).

JAMES O. THOMAS, Jr., Primary Examiner